R. HICKISH.
GREASE CUP.
APPLICATION FILED JULY 25, 1910
984,481.
Patented Feb. 14, 1911.
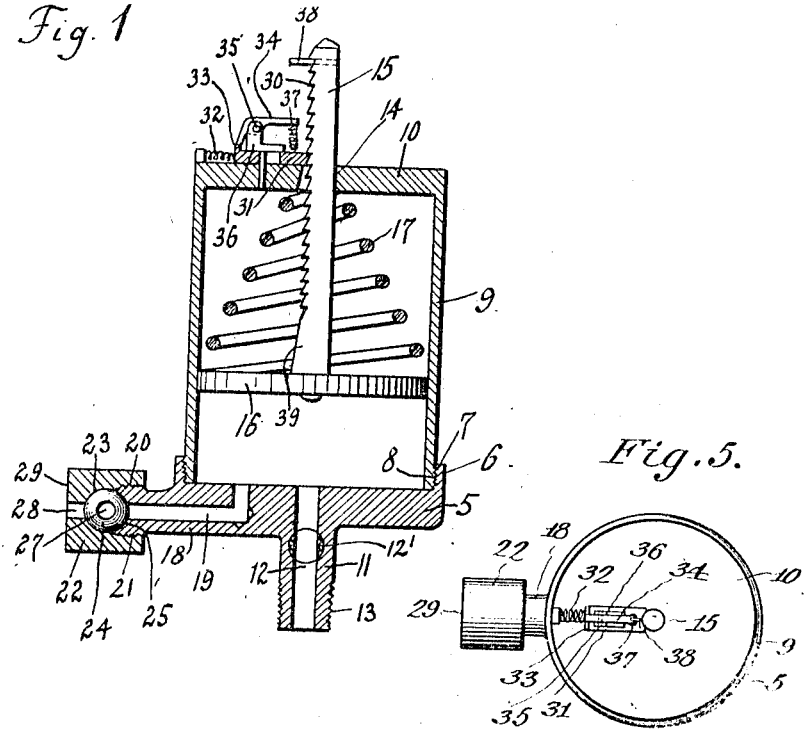
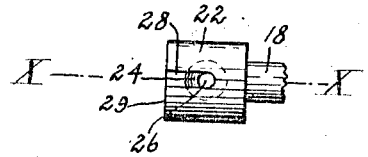
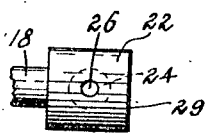
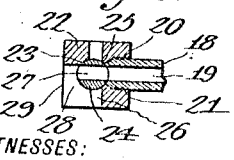
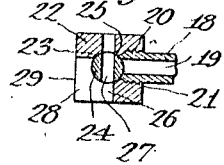
Robert Hickish
INVENTOR
BY Sigmund Herzog
his ATTORNEY
WITNESSES:
V. Kertesz
S. Birnbaum

UNITED STATES PATENT OFFICE.

ROBERT HICKISH, OF TUCKAHOE, NEW YORK.

GREASE-CUP.

984,481.

Specification of Letters Patent.  Patented Feb. 14, 1911.

Application filed July 25, 1910. Serial No. 573,647.

*To all whom it may concern:*

Be it known that I, ROBERT HICKISH, a subject of the King of Hungary, and a resident of Tuckahoe, in the county of Westchester and State of New York, have invented certain new and useful Improvements in Grease-Cups, of which the following is a specification.

The present invention relates to grease cups.

One of the objects of the invention is to provide a cup which will automatically insure a constant discharge of lubricant.

Another object of the invention is to construct a cup which is provided with a simple and inexpensive means, whereby the cup can be refilled with lubricating material without unscrewing the same from the part to be lubricated, and without disengaging from each other any of the parts forming said cup.

With these and other objects in view, which will more fully appear as the nature of the invention is better understood, the same consists in the construction, arrangement and combination of the several parts hereinafter fully described, pointed out in the appended claim and illustrated in the accompanying drawings.

One of the many possible embodiments of the invention is illustrated in the accompanying drawings, in which:—

Figure 1 is a vertical central section of a grease cup constructed in accordance with the present invention; Fig. 2 is an end view of its valve casing and the valve; Fig. 3 is a front elevation of the valve casing and the valve; Fig. 4 is a rear elevation of said valve casing and valve; Fig. 5 is a plan view of the grease cup; and Figs. 6 and 7 are sections taken on line X—X of Fig. 3, showing the valve in its open and closed positions.

In the drawings, the numeral 5 indicates the base of the cup, provided with a cylindrical flange portion 6, the inner face of which is provided with screw threads 7, which mesh with the screw threads 8 of the grease cup body 9. This body comprises a tubular member which is open at its lower end and closed at its upper end by a cover 10, which latter may be made integral with the body portion of the cup, or may be fastened thereto in any suitable manner. The base portion 5 of the cup is provided with a centrally arranged stem 11, throughout which leads a passage 12 to the interior of the grease cup. This stem is screw threaded externally, as shown at 13, for attaching the grease cup to the bearing or other parts to be lubricated. In the cover 10 is formed a central opening 14, through which projects the plunger-rod 15, which carries on its lower end a piston 16, snugly fitting the inner surface of the body portion 9 of the grease cup and bearing against the surface of the grease. A helical spring 17 bears against the inner surface of the cover portion 10 and the piston 16, keeping thereby the piston down against the grease at all times to insure a constant discharge thereof from the cup.

Upon the side of the base portion of the cup is formed a cylindrical extension 18, in which is formed a passage 19 leading to the interior of the cup. This extension is provided with external screw threads 20, meshing with the internal screw threads 21 of the valve casing 22. The valve casing comprises, preferably, a cylindrical member, having a valve seat 23, upon which is arranged a valve ball 24, which is forced against its seat 25 upon the extension 18 when the valve casing is tightly screwed into its place. The valve casing is provided with a bore 26, leading at right angles to the axis of the passage 19 through the valve casing, and adapted to register with the hole 27 in the valve ball 24 when the axis of said hole is arranged at right angles to the axis of the passage 19. A radial recess 28 is formed in the valve casing and extends from the face 29 of said casing in the direction of the longitudinal axis of the same to the bore 26 for a purpose hereinafter to be described.

The plunger-rod 15 is provided with ratchet teeth 30, which are adapted to be engaged by a detent or dog 31, which is slidably arranged upon the cover portion 10 of the cup, and kept in engagement with said ratchet teeth by means of a spring 32, arranged in any suitable manner upon the cover 10. At its rear end the detent carries a lug 33, coöperating with a bellcrank lever 34, fulcrumed at 35 to a brace 36, supported by the cover portion 10, and kept by means of a spring 37 in contact with the lug 33. The spring 37 is fastened to the bellcrank lever 34 and to the detent 31. A pin 38 is attached to the plunger-rod 15, and is adapted to actuate the bellcrank lever 34 in a manner to be described.

The operation of the device is as follows: In order to fill the cup with the lubricating material, the end of the stem of a grease pump is brought into engagement through the bore 26 with the hole 27 in the valve ball and the said valve rotated until its hole registers with the passage 19, leading to the interior of the cup. The recess 28 allows such operation, whereby the stem of the pump will be arranged in the axis of the passage 19. The passage 12, leading from the interior of the cup to the object to be lubricated, is then closed by a valve 12', after which the pump is operated. As the lubricating material is now forced into the grease cup, the piston 16 will be forced upward against the action of the spring 17. As the piston is moved upward, the ratchet teeth are engaged one after the other with the detent or dog 31, which latter holds the piston in any intermediate position and prevents the spring 17 from forcing the piston toward the base, whereby the lubricating material is kept in the cup. As soon as the enlarged end 39 of the plunger-rod forces the detent outward, the spring 37, which tends to raise the substantially horizontal arm of the bell-crank lever 34, engages the said bellcrank lever 34 with the inner face of the lug 33 of the detent, and keeps thereby the same out of the path of the ratchet teeth. In turning the valve ball into a position so that its hole 27 comes to lie at right angles to the axis of the passage 19, and opening the passage 12, the lubrication is started automatically. As the lubrication now proceeds, the piston descends toward the base of the cup. When the piston reaches its lowermost position, the finger 38 will depress the substantially horizontal arm of the bell-crank lever 34 and thus disengage the same from the lug 33 of the detent, whereby the spring 32 is left free to act, forcing thereby said detent into engagement with one of the ratchet teeth, whereby the device is ready for refilling.

What I claim is:

In a grease cup, the combination with a base provided with an aperture for the passage of the grease to the bearing, of a closed tubular body detachably fastened to said base so as to form therewith the cup and having a centrally arranged opening in its cover, a piston operating in said body, a plunger-rod attached to said piston and passing through said opening in the cover of said tubular body, a spring tending to force said piston toward said base, ratchet teeth upon said plunger-rod, a spring pressed dog adapted to engage said ratchet teeth for holding said piston against the action of said spring in intermediate positions between its uppermost and lowermost positions in said tubular body, means for automatically disengaging said dog from said teeth when said piston reaches its lowermost position, a tubular extension upon said base forming a passage leading to the interior of said cup, a valve casing attached to said extension, and a valve in said casing for controlling said passage, substantially as specified.

Signed at New York, in the county of New York and State of New York, this 31st day of May, A. D. 1910.

ROBERT HICKISH.

Witnesses:
S. BIRNBAUM,
JULES H. BAER.